April 2, 1929.  F. H. KNIGHT  1,707,913
SUPPLEMENTAL SEAT ATTACHMENT
Filed May 1, 1926  2 Sheets-Sheet 2
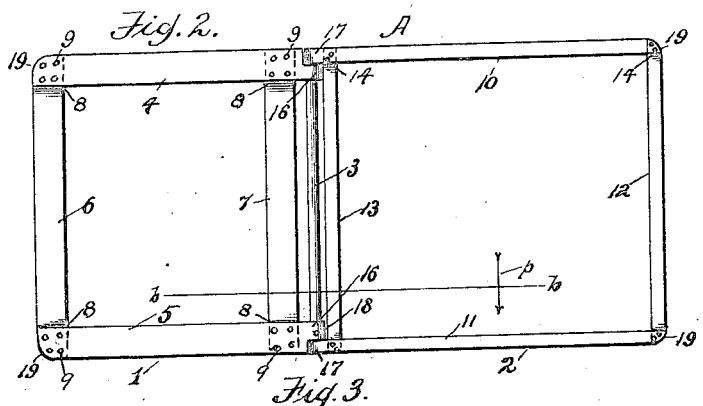
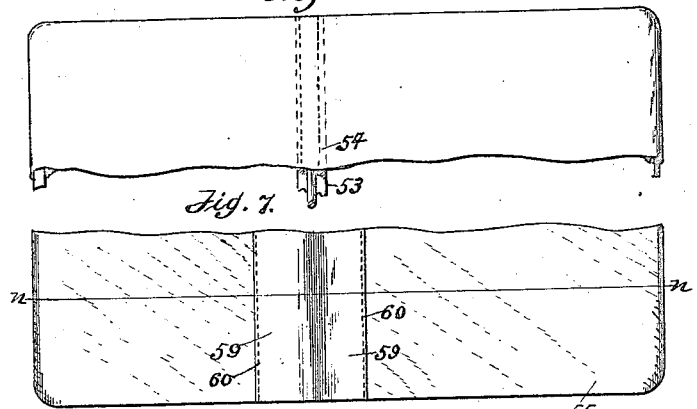
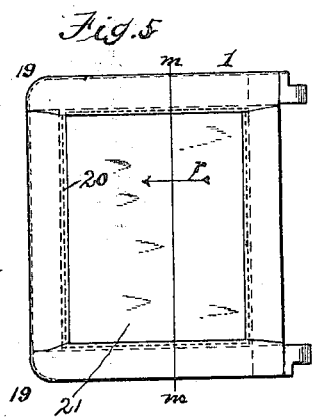
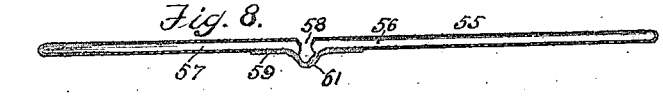
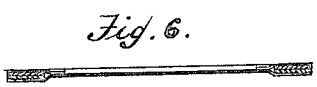
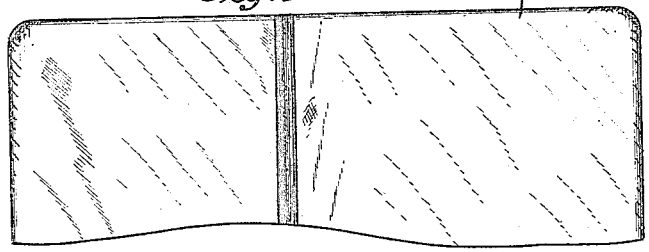
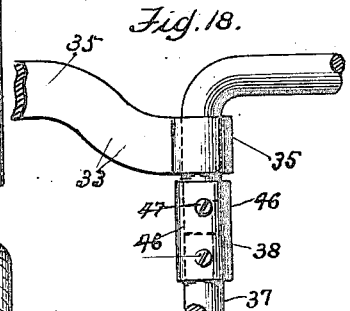
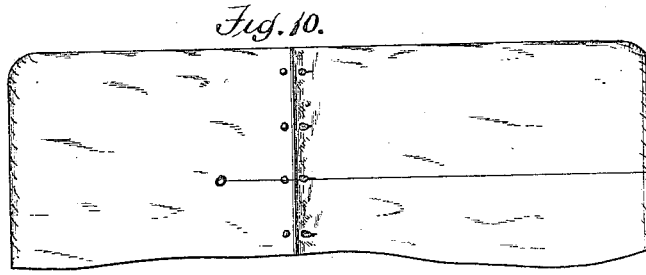
Inventor.
Frank H. Knight,
by Wm. H. H. Knight
His Atty.

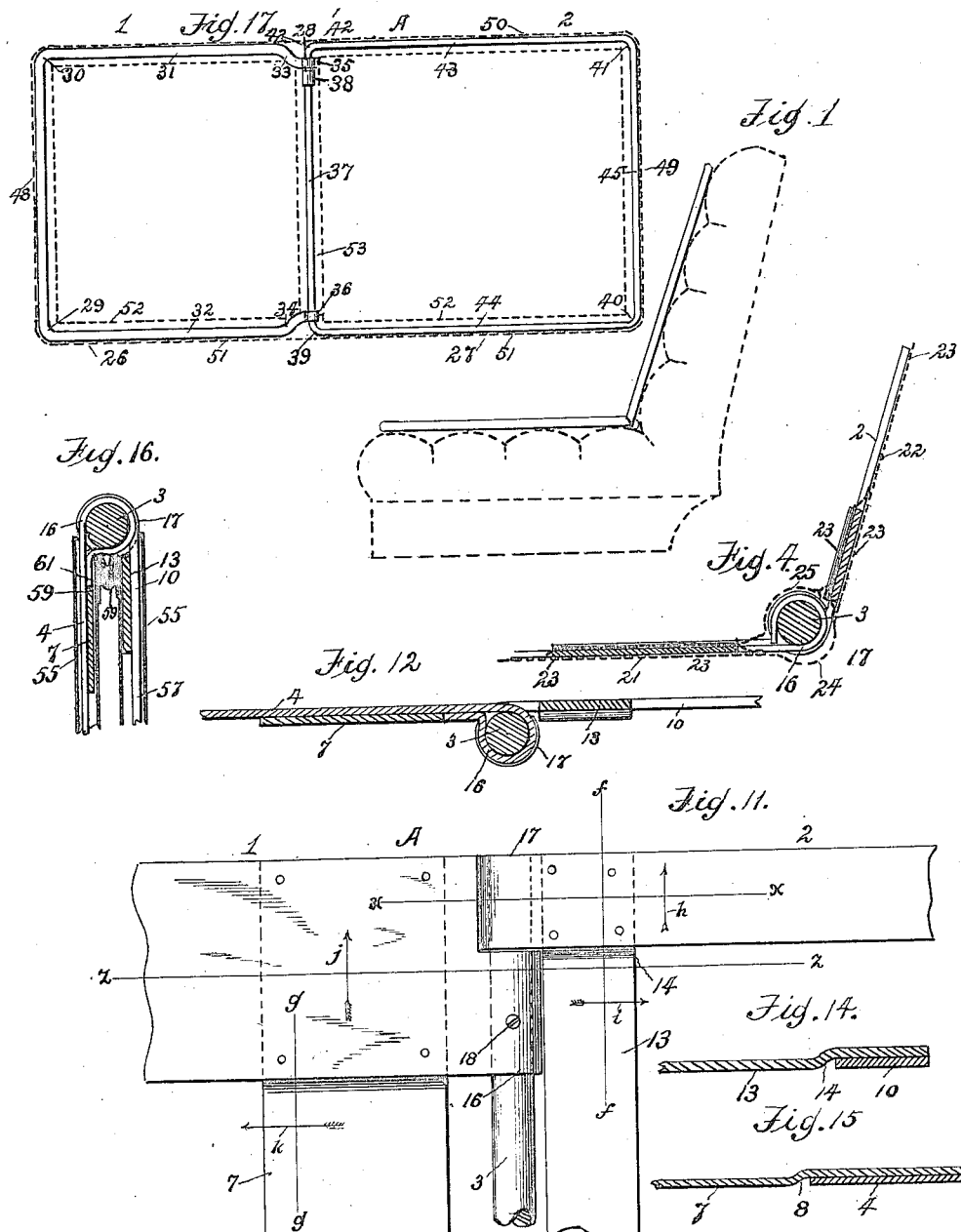

Patented Apr. 2, 1929.

1,707,913

UNITED STATES PATENT OFFICE.

FRANK H. KNIGHT, OF LANCASTER, PENNSYLVANIA.

SUPPLEMENTAL SEAT ATTACHMENT.

Application filed May 1, 1926. Serial No. 106,021.

My invention, while broadly relating to the general class of seats, has yet a more particular relation, as will presently be pointed out, to those seats which are especially designed and adapted for use in automobiles, or similar vehicles that are commonly driven at high speed and which, to such end, are purposely provided with springs having a greater degree of elasticity and also which are more heavily cushioned than are the seats of vehicles usually driven at a low speed, such construction for the purpose of reducing, so far as is possible, discomfort to the occupant of the seat, when the vehicle is in action and particularly so if the roadway, on which the vehicle is moving, be of rough character.

It is however, well known to those who use high speed vehicles of the class above referred to, that the employment of springs of high resiliency in conjunction with heavily cushioned seats, while in a measure, fulfilling the end sought in their use, to wit, the provision of a soft, flexible, resilient seat for the occupant of the vehicle, actually operates to greatly enhance a source of discomfort ever present in vehicles of the class under consideration; I now refer to the friction generated between the back of the occupant of the seat and the back of the seat itself against which such occupant reclines, which friction is due to and brought about by the upward and downward movement of the occupant of the seat through the action of the springs therewithin and the non-movement of the back itself.

In view of the foregoing source of discomfort to the occupants of vehicles of the class referred to and for the purpose of reducing such source of discomfort to the greatest possible extent, if not wholly eradicating it, the present invention has been brought into existence and to the end named consists essentially in a supplemental seat attachment comprising a portion constructed to form a seat and to rest upon the seat proper of the vehicle between the occupant and such seat, a portion constructed to form a back and to extend and bear upon the back proper of the vehicle seat between such back and the back of the occupant and hinged connections between the seat and back portions of said supplemental seat attachment to ensure proper coaction therebetween.

The invention further consists in a supplemental seat attachment comprising, in a single unit a peculiarly constructed metallic frame having a portion provided with a single textile seat, a portion provided with a single textile back, hinged connections between the metallic portions of said frame and where needed a textile casing having similarly formed pockets to receive and enclose the metallic frame sections and their connected textile portions.

The invention further consists in the construction, arrangement and combination of the several parts comprised therein substantially as hereinafter described and claimed, and illustrated in the accompanying drawings, wherein—

Figure 1, illustrates in dotted outline, an automobile seat having my improved supplemental seat attachment mounted thereon in position for use.

Figure 2, is a bottom plan view of the metallic frame comprised in my invention as it appears when disengaged from the textile portions which form the seat and back thereof.

Figure 3, shows in a bottom plan view, a portion of the frame illustrated in Fig. 17, provided with the textile material which forms the seat and back portions of my improved supplemental seat attachment.

Figure 4, is an enlarged sectional detail view taken on the line $b$—$b$, of Fig. 2 and looking in the direction indicated by the arrow $p$.

Figure 5, illustrates in a bottom plan view the seat portion of the metallic frame of my improved seat attachment provided with a textile fabric seat.

Figure 6, is a transverse sectional view taken on the line $m$—$m$, of Fig. 5 and looking in the direction indicated by the arrow $r$.

Figure 7, illustrates, in a bottom plan view, a casing which may be employed in connection with the metallic frame and its connected fabric seat shown in Fig. 3.

Figure 8, is a longitudinal sectional view, taken on the line $n$—$n$, of Fig. 7, to show the frame receiving pockets therein.

Figure 9, is a top plan view of the casing shown in Fig. 7.

Figure 10, shows in a top plan view, a casing similar to that shown in Fig. 7, and having pockets to receive the frame of the attachment and means for securing the opening thereto.

Figure 11, shows in a bottom plan, of nearly or quite full size, a portion of the metallic frame shown in Fig. 2.

Figure 12, is a sectional view taken on the line z—z, of Fig. 11.

Figure 13, is a similar sectional view taken on the line x—x, of said Fig. 11, to illustrate the construction thereof.

Figure 14, is a sectional view on the line f—f, of Fig. 11, looking in the direction of the arrow i, to show that the lower surfaces of the members of the frame extend in like planes.

Figure 15, is a similar sectional view taken on the line g—g, of Fig. 11, and looking in the direction indicated by the arrow h.

Figure 16, is a detail sectional view to illustrate position of the upper and lower sections of the metallic frame, when the casing, shown in Figs. 9 and 10, is to be placed thereon.

Figure 17, shows, in a top plan view, another form of the adaptation to practice, of the metallic frame comprised in my invention.

Figure 18, illustrates, in a detail view, the manner in which the parts of the metallic frame shown in Fig. 17, are connected together.

Similar letters and numerals of reference, in the several figures of the drawing, denote similar parts.

Heretofore, in supplemental seat connections designed for use in conjunction with the seats of automobiles and similar vehicles, it has been the universal custom to provide both the seat and the back portions of such devices, with a cover or coverings which are either constructed of, or used in conjunction with a material of more or less rigid character, as for instance, of woven wire springs, of flexible strips of thin steel, of strips of bamboo, or of cane of a type other than bamboo, each and all thereof having in view a common end or purpose, to wit, the provision of a device wherethrough discomfort, due to friction between the back of said seat and the back of the occupant thereof, might be overcome so far as it is possible so to do.

It is however a matter of fact that devices of the character above outlined, while to a certain extent accomplishing the end sought, that is to say, the reduction of the friction noted to a minimum, operates to bring about a result that nullifies to a very great extent the usefulness of the devices named for, constructed as above described, while the occupant of the supplemental seat is thereby relieved from discomfort due to friction as above described, he yet, through the interposition of such seat between his body and the seat and back of the vehicle itself, absolutely fails to enjoy or to derive benefit to any extent whatever, from the resiliency of the cushioned seat and back of the vehicle upon and against which said supplemental seat rests and bears, because of the non-resiliency of said latter named seat as will be clearly apparent.

In contradistinction to the devices hereinbefore referred to, the invention which forms the subject matter of the present application, contemplates the provision of a supplemental seat attachment which, while fully assuring the occupant of said attachment freedom from the discomfort of friction hereinbefore noted, also enables such occupant to fully enjoy the resiliency of the cushioned seat and back of the vehicle seat itself upon and against which both he and the supplemental seat he is using rests and reclines.

In carrying my invention into practice I employ a body A, which in its first to be described adaptation to practice consists essentially in three major elements, to wit, a section 1, which, with its peculiar construction to be hereinafter definitely described, forms the seat portion of my improved supplemental seat attachment and is to rest upon the cushioned seat of the vehicle: a section 2, of purposely formed greater length than that of section 1, and of like construction is to form the back portion of said attachment and is to rest and bear upon the cushioned back of the vehicle seat: and a bar or rod 3, to which each of the sections 1 and 2, is hinged and which extends, at the junction of said sections from outer edge to outer edge thereof, as shown in Fig. 2.

I provide that the frame of the section 1, of the body A, and which as noted, forms the seat portion of my device, shall consist of four thin flat strips 4, 5, 6 and 7, of spring steel of such width as is necessary to impart the proper degree of resiliency to said section to accomplish the result sought: I further provide that the front and rear strips 6 and 7, of section 1, shall at each of their ends be bent at 8, both upwardly and outwardly to ensure that the bottom surface of said strips 6 and 7, shall, when connected to the side strips 4 and 5, by rivets 9, or otherwise, extend in the plane of the bottom of said side strips for a purpose presently to be explained.

I also provide that the frame of the section 2, of the body A, and which as noted, forms the back portion of my device, shall also consist of four strips or bars 10, 11, 12 and 13, of spring steel and shall be both narrower and thicker than are the corresponding strips of the section 1, to ensure the proper degree of rigidity to fulfill purposed functions of said strips: I further provide that the top and bottom strips or bars 12 and 13, shall at each of their ends be bent at 14, both upwardly and outwardly, in manner likeunto the corresponding strips 6 and 7, of section 1, and that the bottoms thereof shall, when said bars or strips 12 and 13, are connected to the side strips or bars 10 and 11, by rivets or otherwise, extend in the plane of the bottoms of said bars 10 and 11, for a purpose similar to that of the corresponding parts of section 1.

The sections 1 and 2, are to be hinged together as shown in Figs. 2 and 11, to which end I extend the adjoining ends of the side strips 4 and 10, and 5 and 11, respectively of the sections 1 and 2, beyond the cross strip 7, and bar 13, of said sections and form loops 16 and 17, upon each of said adjoining ends respectively, to extend about the rod 3, at the opposite ends thereof, see Figs. 11 to 13, inclusive; I provide that the rod 3, shall be held from movement within the loop 16, of section 1, by screws 18, which extend through said loops 16, to and into the rod 3.

I provide that the outer end corner 19, of each of the sections 1 and 2, shall be rounded as shown, for a purpose presently to be explained.

I provide, as has been hereinafter intimated, that both the seat and the back sections 1 and 2, respectively, of my improved supplemental seat attachment, shall be so constructed that the occupant of said attachment, shall ride as easily and shall as fully enjoy the resiliency and comfort of the cushioned seat of the vehicle, whereon such attachment rests, as he would did not such attachment extend between his body and the vehicle seat itself.

To the accomplishment of the end last above set forth, and for the purpose of clearly setting forth one peculiar adaptation of my invention to practice, I provide that the seat and back of the sections 1 and 2, comprised in my invention shall, with the sole exception of the frames hereinbefore described, consist of a suitable textile fabric, as for instance, of khaki or analogous material, and that such material shall—for the purpose of the adaptation of my invention to practice as above set forth—extend in single ply between and be permanently secured to the front, back and opposite side strips of each of the frames of the sections 1 and 2, independently of each other, as shown in Figs. 5 and 6, wherein the fabric is shown as having been turned down over the front, back and side strips and stitched along the inner edges thereof, as shown by the dotted line 20, to form the seat 21, of the section 1; it is to be understood that the fabric portion 22, of the section 2, is to be secured to the frame thereof in manner likeunto that employed in section 1, see Fig. 4, wherein the heavy dotted line 23, designates such fabric.

I provide that the space between the fabric seat 21, and back 22, of the sections 1 and 2, respectively, shall be closed upon both the upper and the lower surfaces of the device, by strips of fabric 24 and 25 which are connected at each of their side edges to the fabric seat 21, and back 22, respectively and to extend loosely therebetween to cover the bar 3, see Fig. 4.

In Fig. 17, I illustrate as a modification of the device set forth in Fig. 2, and hereinbefore described, a device which consists essentially in a body A, having a frame section 26, adapted to form the seat portion of said modification, a frame section 27, adapted to form the back portion of said modification and hinging means 28, for connecting said sections 26 and 27, together to operate in the same manner and to fulfill the same functions as does the device set forth in Fig. 2, and as is fulfilled by such device named, and which, while operating in and to the manner and end set forth, yet differs somewhat from the device set forth in said Fig. 2, in its construction.

To the end above set forth I provide that the frame section 26, shall consist of a single piece of flat spring steel of suitable size and which, bent at 29 and 30, at right angles to form a U-shaped frame section, is provided at the ends of each of its opposite side arms 31 and 32, with inwardly and rearwardly bent portions 33 and 34, which each terminate in a loop 35 and 36, respectively, to receive the side rod 37, comprised in the frame section 27, for a purpose presently to be explained.

I provide that the frame section 27, shall be formed of a single piece of round spring steel rod and that starting at 38, at which the ends of said rod are to be brought together within the sleeve 38, said rod shall at 39, 40, 41 and 42, be bent at right angles as shown, that the section 27, formed thereof shall have side rods 43 and 44, that extend in planes parallel each with the other and at a distance from each other equal to that of the rods 31 and 32, of the section 26; in common with the section 2, of Fig. 2, the section 27, is of greater length than is the section 26, and the upper side rod 45, of said section 27, is to be parallel with the rod 37, which latter named is common to each of the sections 26 and 27, as shown; the opposite ends of the rod which forms the section 27, abut within the sleeve 38, as shown by the dotted line 46, and are held rigid therein by screws 47, as shown in Fig. 18.

While the sections 26 and 27, last above described, may if desired each be provided with a single seat and back of fabric of single ply, likeunto the seat 21, of the section 1 shown in Fig. 5, and be secured in position upon said sections 26 and 27, in manner similar to that employed in the securing of the seat noted, I yet prefer to provide said modified body A, of my invention with a seat and back formed in a single piece of fabric and to said end, I extend from end to end and side to side respectively, of the combined sections 26 and 27, comprising said body A, and upon the lower and back surface thereof, a single piece of fabric, preferably of khaki or of analogous material, as shown in Fig. 3, and further indicated in Fig. 17, by the dotted lines 48, 49, and 50, 51, at the ends and sides respectively of said sections. I provide that the material forming the seat and back, shall be turned over the sides and outer ends of the sections 26 and 27, and stitched along the inner edge thereof, as indicated by the dotted lines 52, to form casings within which the frame of said sections 26 and 27, extend; I also provide that a strip of fabric 53, shall extend across the body A, from side to side thereof and above rod 37, to form a casing within which such rod is to extend, the casing noted is to be stitched to the fabric therebelow along the side of said rod 37, as shown by the dotted lines 54, in Fig. 3.

Figs. 7, 8 and 9, illustrate a modified form of seat and back for use in connection with the sections 1 and 2, and 26 and 27, in lieu of the type of seat and back shown in Figs. 3, 4 and 5, and hereinbefore described and said modification consists essentially in a casing 55, formed of a suitable fabric, preferably khaki or analogous material, and provided with pockets 56 and 57, for the reception of the sections 1 and 2, and 26 and 27, to which end said pockets are provided. I provide that the casing 55, shall, upon its lower surface and immediately below the opening 58, of the respective pockets 56 and 57, therein be provided with a reinforcement 59, consisting of a strip of material likeunto that of which such casing is made and which extends from side to side of the casing and is stitched thereto as shown at 60, see Fig. 7; I further provide that the bottom portion of the casing 55, and the reinforcement 59, thereon shall at 61, below the openings of the pockets 56 and 57, be of sufficient length to permit the casing 55, after the sections 1 and 2, or 26 and 27, have been placed therein, in manner shown in Fig. 16, to allow such sections to assume the position shown in Fig. 4, at which time the device is in position for use in the vehicle.

Figs. 9 and 10, show respectively, in Fig. 9, the open ends of the pockets 56 and 57, and in Fig. 10, such open end provided with closing means.

It is to be understood that the casing 55, may be used upon the sections 1 and 2, or the sections 26 and 27, of the body A, in conjunction with the single seat and back of textile fabric hereinbefore described in connection therewith, in order that when desired, the textile fabric seat or back, shall consist of more than one ply or thickness of material, instead of the single ply hereinbefore described, or such casing may alone be used upon the sections named, in lieu of the single ply above named.

I have by practice found that through the employment of freely moving hinge connection—between the metallic frame sections 1, 2, and 26, 27,—such as has been set forth in the drawings which form a part hereof, I have very materially added to the efficiency of my improvement in supplemental seat attachment, inasmuch as I have employed in such attachment and in conjunction with such metallic frame sections, both a seat and a back formed of one or more plies or thicknesses of a textile fabric, to wit, khaki or material of like character, which is alone to serve as the interposed medium between the surfaces of the seat and back of the vehicle and the occupant of the supplemental seat attachment that is to be mounted upon such vehicle seat, for the reason that such freely moving hinge connection between the parts named, will not only permit the occupant of the attachment to be lightly swayed forward and backward while constantly remaining in touch with the textile seat and back of the supplemental seat attachment and therethrough with the seat and back of the vehicle itself, but will also operate to facilitate the free upward and downward movement of the textile back of such attachment and thus reduce friction therebetween.

While I am aware that the use of supplemental seat attachments of various types and descriptions have heretofore been used in connection with the seats and backs of automobiles and other vehicles that are adapted for like service, for the purpose of preventing discomfort to the occupant of such attachments, I am not aware that supplemental seat attachments wherein a highly flexible textile fabric, has been employed in conjunction with metallic frame supports, as the seat and back of such attachment, to alone interpose between the seat and back thereof, of an automobile or similar vehicle, and the occupant of such attachment, in view of which I claim the right to make and use each and all such modifications of the device hereinbefore set forth, as shall fall within the scope and limit of the claim appended hereto.

Having thus described my invention, I claim and desire to secure by Letters Patent:

In a supplemental seat attachment for vehicles a metallic section comprising a rod of steel bent into quadrilateral form to support a seat back formed of a textile fabric, a sleeve receiving the opposite contacting ends of the rod forming such metallic section, and screws or pins extending through said sleeve to and into said rods to prevent movement thereof within said sleeve, a metallic section comprising a rod of steel bent into a U shaped form and having its opposite side rods of equal length and the connecting portion therebetween at right angles thereto to support a textile fabric seat, an inwardly and forwardly bent portion formed at the end of each of the side rods of the U shaped metallic section and terminating in loops embracing the rearward rod of the quadrilateral section to form hinge connections between said metallic sections, and a textile fabric member connected to the metallic sections to form the seat and back of the supplemental seat attachment.

In testimony whereof I hereto affix my signature.

FRANK H. KNIGHT.